United States Patent
Kobayashi

(10) Patent No.: US 7,671,895 B2
(45) Date of Patent: Mar. 2, 2010

(54) IMAGING PICKUP DEVICE WITH HALF-SHUTTER ALERT

(75) Inventor: Akio Kobayashi, Kyotanabe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 776 days.

(21) Appl. No.: 10/566,987

(22) PCT Filed: Jul. 22, 2004

(86) PCT No.: PCT/JP2004/010394
§ 371 (c)(1),
(2), (4) Date: Feb. 2, 2006

(87) PCT Pub. No.: WO2005/015898
PCT Pub. Date: Feb. 17, 2005

(65) Prior Publication Data
US 2006/0215039 A1    Sep. 28, 2006

(30) Foreign Application Priority Data
Aug. 7, 2003   (JP)   ............... 2003-206424

(51) Int. Cl.
H04N 5/225 (2006.01)
H04N 5/222 (2006.01)
G03B 17/00 (2006.01)
G03B 17/18 (2006.01)

(52) U.S. Cl. .................. 348/220.1; 348/333.04; 348/371; 396/88; 396/281

(58) Field of Classification Search ......... 348/220.1, 348/333.04, 370, 371; 396/286, 290, 291, 396/292, 296, 88
See application file for complete search history.

(56) References Cited

U.S. PATENT DOCUMENTS

| 5,231,446 A | * | 7/1993 | Ohtsuka | 396/59 |
| 5,598,242 A | * | 1/1997 | Omi et al. | 396/55 |
| 6,704,506 B2 | * | 3/2004 | Sasagawa | 396/88 |

(Continued)

FOREIGN PATENT DOCUMENTS

JP    5-83625    4/1993

(Continued)

OTHER PUBLICATIONS

Notice of Reasons for Refusal dated Oct. 28, 2008 corresponding to Japanese application No. 2003-206424 w/partial translation.

*Primary Examiner*—John M Villecco
(74) *Attorney, Agent, or Firm*—Kratz, Quintos & Hanson, LLP

(57) ABSTRACT

The image pickup device of the present invention is capable of photographing still images during photography of a moving image, and is provided with a notifying means for visually notifying a subject that a photographic operation of a still image is to be performed when a release button 23 is pressed half-way down during photography of the moving image, and then performs the photographic operation when the release button 23 is fully pressed. The first notifying means may be a light emitting means 25 which lights up or flashes when the release button 23 is pressed half-way down, or maybe a flash lamp device in which a light source 27 pops up when the release button 23 is pressed half-way down.

13 Claims, 3 Drawing Sheets

U.S. PATENT DOCUMENTS

| | | | |
|---|---|---|---|
| 6,919,927 B1 * | 7/2005 | Hyodo | 348/333.02 |
| 6,944,345 B2 * | 9/2005 | Hayashi et al. | 382/232 |
| 7,110,666 B2 * | 9/2006 | Abe et al. | 396/59 |
| 7,315,323 B2 * | 1/2008 | Ito | 348/333.02 |
| 7,499,643 B2 * | 3/2009 | Yoon | 396/283 |
| 2004/0090533 A1 * | 5/2004 | Dow et al. | 348/220.1 |
| 2005/0200754 A1 * | 9/2005 | Lee | 348/371 |
| 2005/0243179 A1 * | 11/2005 | Yokonuma | 348/220.1 |

FOREIGN PATENT DOCUMENTS

| | | |
|---|---|---|
| JP | 06175208 A * | 6/1994 |
| JP | 2000-307904 | 11/2000 |
| JP | 2001-103361 | 4/2001 |
| JP | 2001-309210 | 11/2001 |
| JP | 2002-142179 | 5/2002 |
| JP | 2003-228116 | 8/2003 |
| WO | WO 03101092 A1 * | 12/2003 |

\* cited by examiner

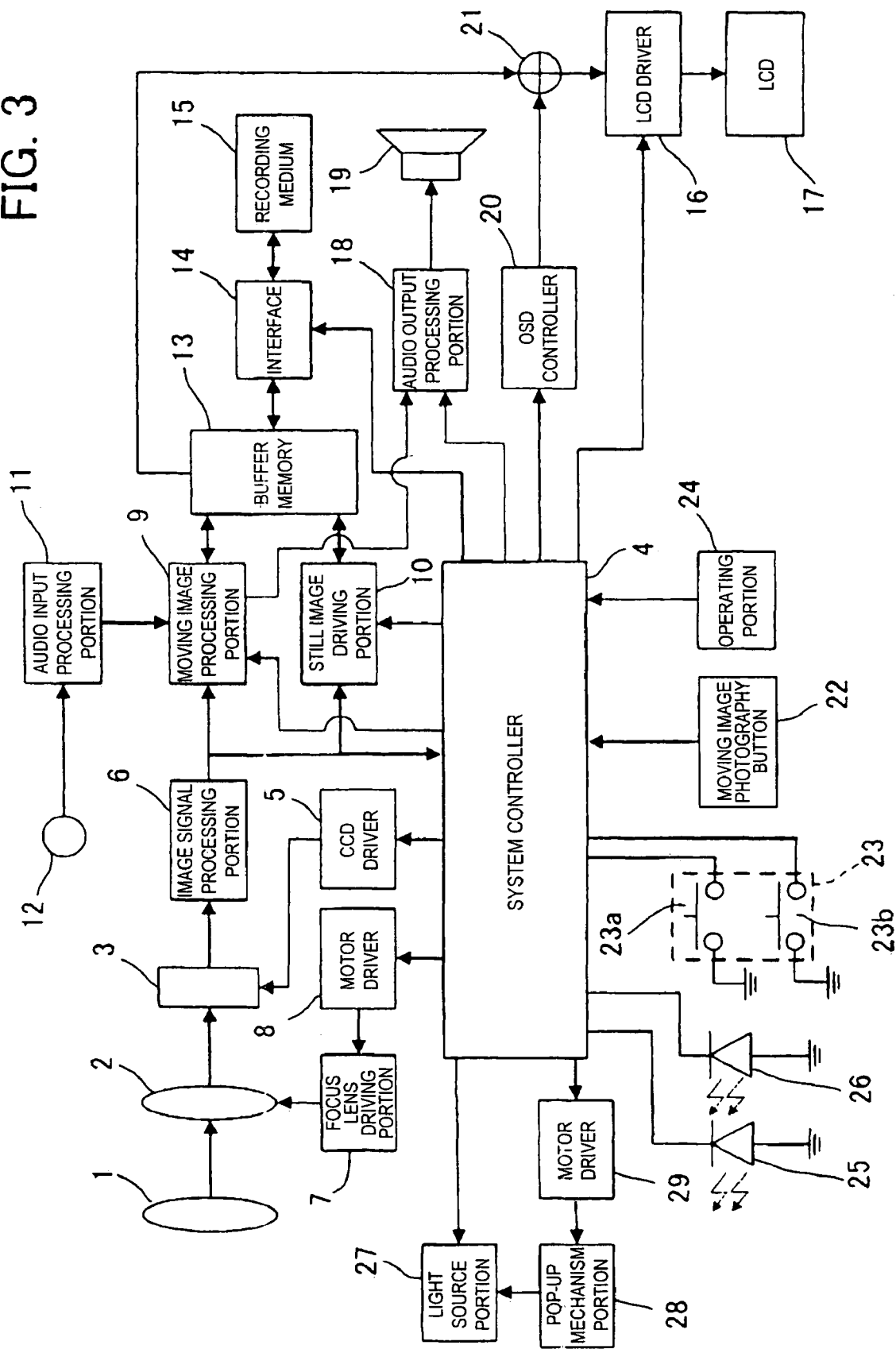

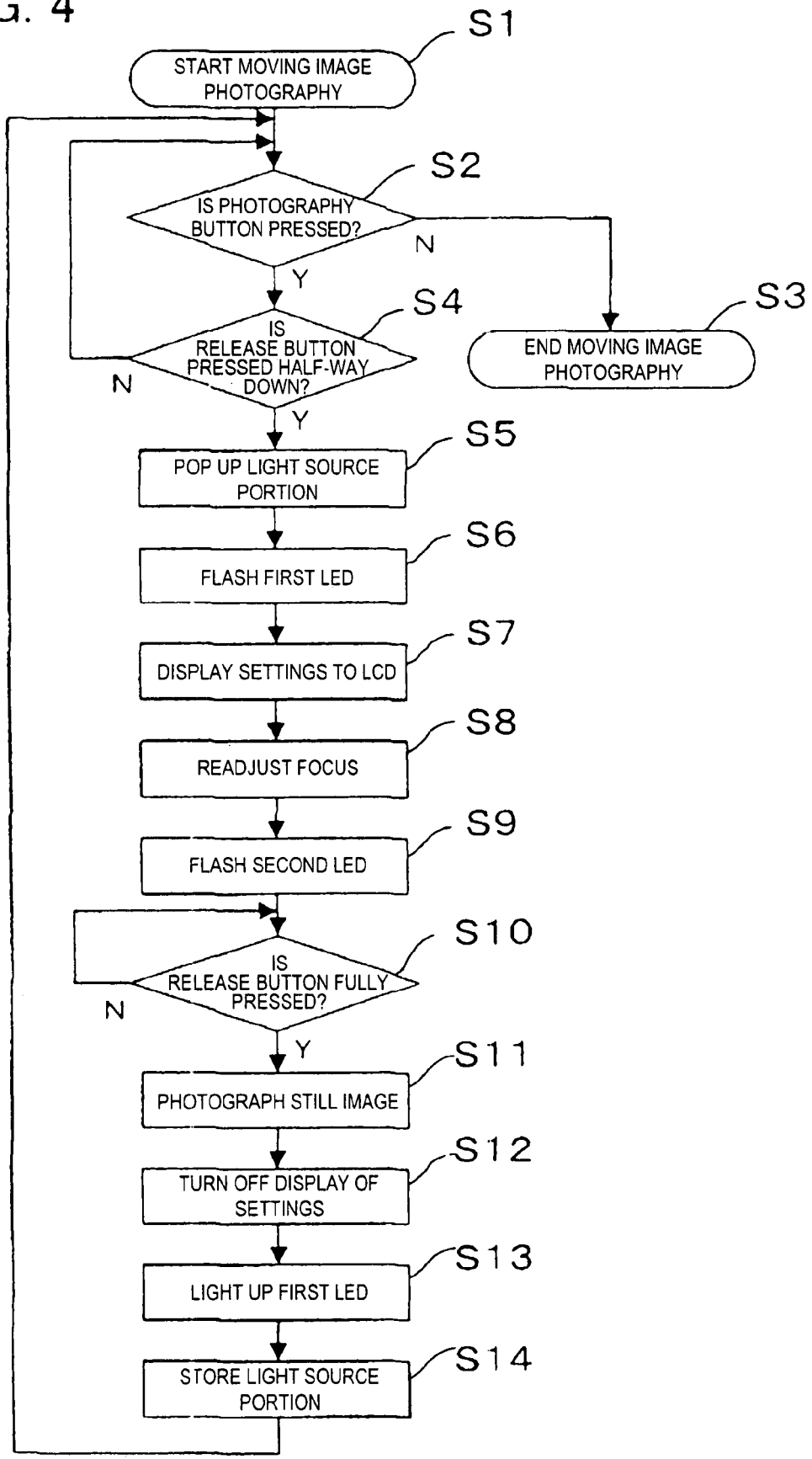

IMAGING PICKUP DEVICE WITH HALF-SHUTTER ALERT

TECHNICAL FIELD

The present invention relates to image pickup devices which are capable of photographing still images during photography of a moving image.

BACKGROUND ART

In recent years, image pickup devices have been proposed which are capable of photographing still images during photography of a moving image. Such image pickup devices are generally provided with a moving image processing portion for processing image data for moving images achieved from output signals from solid-state image pickup elements such as a CCD (Charge Coupled Device) and a still image processing portion for processing image data for still images achieved in a similar fashion. When a first button for starting photography of a moving image is pressed, image data processed in the moving image processing portion is sequentially recorded onto a recording medium, and when a second button is pressed which starts photography of a still image with the first button still pressed, image data processed in the still image processing portion is also recorded onto the recording medium (as disclosed in JP 2001-103361A, for example).

DISCLOSURE OF INVENTION

Problems to be Solved by the Invention

Let us consider a case in which a person is the photographic subject. For example, in a case in which the subject is being photographed in agreement with the photographer using an image pickup device capable of photographing only still images, the subject can anticipate the timing of the photography and strike a pose during the photography which is desired to be recorded as a still image.

However, in a case in which still images of the subject are photographed using an image pickup device capable of photographing still images during photography of a moving image, it is difficult for the subject to know whether a still image is being photographed during the photography of a moving image, even if he or she knows that photography of a moving image is being performed. Further, even if the subject knows that photography of a still image is to be performed during the photography of a moving image, it is even more difficult to anticipate the timing of the photography of a still image. Accordingly, in the case in which still images are photographed during photography of moving a image with a conventional image pickup device, it is extremely difficult for the subject to strike poses during photography which are desired to be recorded as still images.

Needless to say, if the photographer and the subject speak during photography of the moving image, the subject can find out that photography of a still image is to be performed, and further anticipate the timing of the photography of the still image through announcements by the photographer, and strike the desired poses during photography of the still images. However, in a case in which audio is recorded together with the moving image by the image pickup device, a problem arises in that conversation between the photographer and the subject and the voice of the photographer are added to the audio being recorded.

The present invention resolves these problems, providing an image pickup device which is an image pickup device capable of photographing still images during photography of a moving image, which notifies a subject that a still image is being photographed during photography of a moving image, enabling the subject to anticipate the timing of the photography of the still image.

Means for Solving the Problems

The image pickup device of the present invention is an image pickup device capable of photographing still images during photography of a moving image, provided with a first notifying means for visually notifying a subject that a photographic operation of a still image is to be performed when a release button is pressed half-way down during photography of the moving image, and then performs the photographic operation when the release button is fully pressed.

Further, the image pickup device according to the present invention is such that when the release button is pressed half-way down, settings related to the photographic operation of a still image are displayed to a display portion. Further, the image pickup device according to the present invention is such that when the release button is pressed half-way down, a readjustment operation of the focus is performed, and a second notifying means is provided for notifying that the focus is correct after completion of the readjustment operation.

EFFECT OF THE INVENTION

By providing to the image pickup device a first notifying means for notifying a subject that a photographic operation of a still image is to be performed when a release button is pressed half-way down during photography of a moving image, the subject can, in the case in which the subject is a person, know that a still image is being photographed during photography of the moving image, anticipate the photographic timing, and strike a pose which is desired to be recorded as the still image. When the photographer fully presses the release button after the subject has struck a pose, a still image of the subject striking the desired pose is photographed during photography of a moving image. The first notifying means performs notification visually, so in a case in which the image pickup device is recording audio together with a moving image, the subject can be notified that photography of a still image is to be performed without affecting the audio which is being recorded. The first notifying means is, for example, a light emitting means such as a light emitting diode which lights up or flashes when the release button is pressed half-way down, or a flash lamp device in which a light source portion pops up when the release button is pressed half-way down, or a combination thereof.

If the image pickup device is configured such that settings related to the photographic operation of a still image are displayed to a display portion when the release button is pressed half-way down, the photographer using the image pickup device can check the settings before photographing a still image. Furthermore, in a case in which the display portion operates as an EVF (Electro-view Finder), displaying the settings allows the photographer to know which scene of the through image which are being displayed to the display portion or the moving images which are being recorded is the still image which is being photographed.

By being provided with the second notifying means for notifying that the focus is correct after completion of the readjustment operation of the focus when the release button is pressed half-way down, the image pickup device can notify the photographer that preparations for photography of a still image are complete.

BRIEF DESCRIPTION OF THE DRAWINGS

FIG. 3 is a block diagram showing an overview of the image pickup device according to the present invention.

FIG. 4 is a flowchart showing a still image photographic operation during photography of a moving image performed by the image pickup device according to the present invention.

EXPLANATION OF REFERENCE NUMBERS

(17) LCD
(23) Release button
(25) First LED
(26) Second LED
(27) Light source

DETAILED DESCRIPTION OF THE PREFERRED EMBODIMENT

Figure 1:
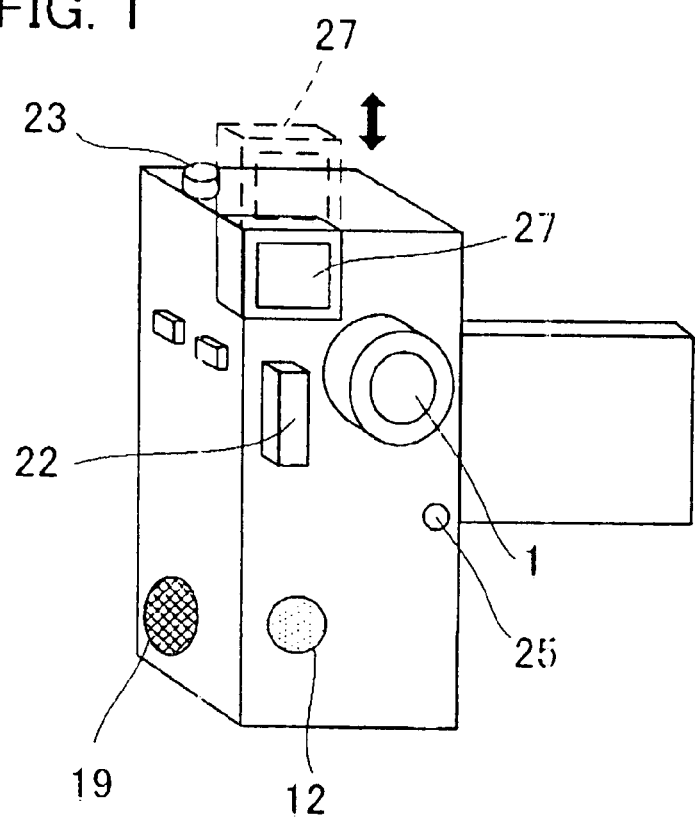
FIG. 1 is a perspective view of an image pickup device according to the present invention from the front.
Figure 2:
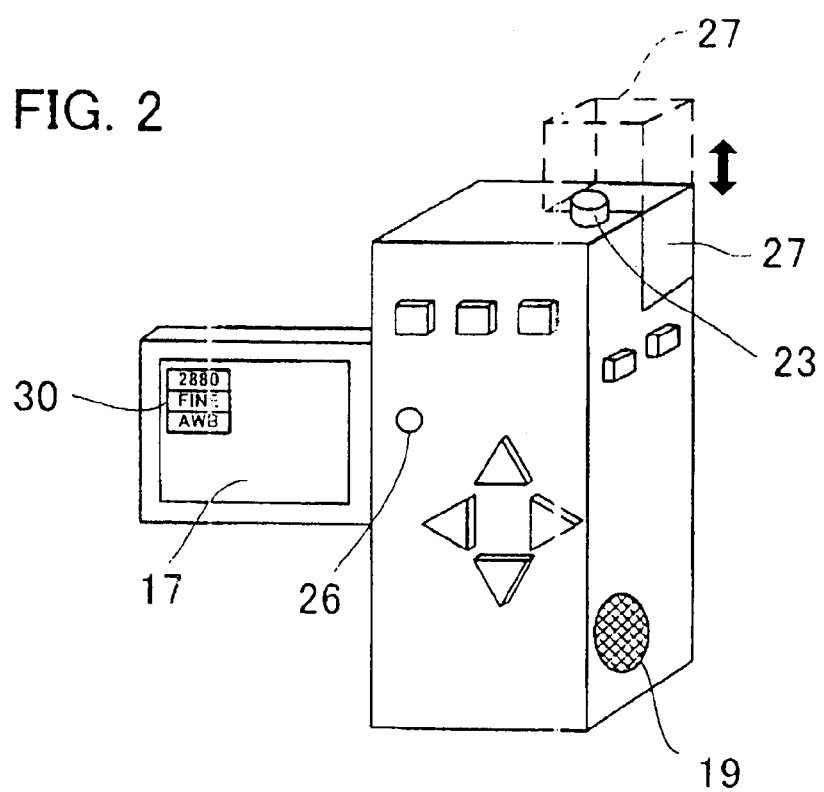
FIG. 2 is a perspective view of the image pickup device according to the present invention from the back.

The following is a description of an embodiment of the present invention, with reference to the drawings. FIG. 1 is a perspective view from the front of an image pickup device, which is one embodiment of the present invention, and FIG. 2 is a perspective view of the image pickup device from the back. The image pickup device is a digital video camera and is capable of photographing moving images and still images. A zoom lens (1), a first light emitting diode (hereafter, "LED") (25), a microphone (12), and a moving image photography button (22) for starting a moving image photographic operation are arranged on a front surface portion of the image pickup device. In a case in which the image pickup device is set to a moving image photography mode, the image pickup device continuously performs image pickup of moving images as long as the moving image photography button (22) is pressed.

A light source portion (27) of a flash lamp device is provided in the front surface portion of the image pickup device. The flash lamp device is of a pop-up type, and is configured to move freely in a vertical direction. The light source portion (27) rises (pops up) before emitting light and protrudes from a top surface portion of the image pickup device, as shown by the broken lines in FIG. 1 and FIG. 2.

A release button (23) which starts a still image photographic operation is arranged on the top surface portion of the image pickup device. When the release button (23) is fully pressed in the case in which the image pickup device is set to still image photography mode, or if the release button (23) is fully pressed in addition to the moving image photography button (22) in the case in which the image pickup device is set to moving image photography mode, the image pickup device performs photography of a still image. An LCD (Liquid Crystal Display) (17), which is the display portion, is provided in one side surface of the image pickup device. The LCD (17) functions as an EVF by displaying a through image during image pickup. Recorded moving images or still images are displayed to the LCD (17), and furthermore various settings screens and settings of the image pickup device are also displayed. Buttons for various types of mode settings, a speaker (19) which plays back audio which has been recorded, and so on are arranged on another side surface of the image pickup device. Various operation buttons, a second LED (26), and so on are arranged on a rear surface of the image pickup device.

FIG. 3 is a block diagram showing an overview of the image pickup device according to the present embodiment. Light sent from the subject passes through the zoom lens (1) and a focus lens (2) and enters a CCD (3) which is an image pickup element. The CCD (3) converts the entering light to electric image signals. A system controller (4) controls reading of the image signals from the CCD (3) via a CCD driver (5). An image signal processing portion (6) samples the image signals read from the CCD (3) in a predetermined cycle, amplifies them to a predetermined level, digitizes them, and converts them to image data.

The focus lens (2) can move back and forth along the light axis of the entering light through operation of a focus lens driving portion (7). The focus lens driving portion (7) includes a stepping motor, and a motor driver (8) rotates the stepping motor in an orientation and at a rotational speed instructed by the system controller (4). The system controller (4) gives the motor driver instructions regarding rotation orientation and rotational speed such that the focus lens (2) is moved to a focus position based on contrast of the image data sent from the image signal processing portion (6). Automatic adjustment of the focus is thus performed in the image pickup device. Like the focus lens (2), the zoom lens (1) can also move along the light axis, although figures and a description are omitted.

The image data is sent from the image signal processing portion (6) to a moving image processing portion (9) and a still image processing portion (10). An audio input processing portion (11) is connected to the moving image processing portion (9) and the audio input processing portion (11) converts audio detected by the microphone (12) to audio data and sends this to the moving image processing portion (9). The moving image processing portion (9) performs a pixel-skipping process on the image data which makes up a moving image sequentially sent from the image signal processing portion (6). In the case in which the image pickup device is operating in the moving image photography mode, the moving image processing portion (9) performs a compression process on the image data which has undergone the pixel-skipping process and the audio data sent from the audio input processing portion (11), and furthermore turns the processed image data and audio data into a data stream through a multiplexing process. For the compression and multiplexing processes, an MPEG (Moving Picture Experts Group)2 or MPEG4 system, for example, are used. The data stream generated by the multiplexing process is temporarily stored in a buffer memory (13) and then recorded as a single file in a recording medium (15) via an interface portion (14). A memory card, a DVD (Digital Versatile Disk)-RW or DVD-RAM, and so on may be used for the recording medium (15).

Image data which has undergone the pixel-skipping process by the moving image processing portion (9) is temporarily stored in the buffer memory (13) without undergoing the compression process, and is displayed to the LCD (17) as through images via an LCD driver (16). The LCD (17) thereby functions as an EVF when photographing a moving image or still image. In the case in which a file of the moving image recorded on the recording medium (15) is played back, the moving image processing portion (9) performs separation and decompression processes on the data stream related to the file which is sent from the recording medium (15) via the interface portion (14), and sends the image data and audio data achieved through these processes to the LCD driver (16) and an audio output processing portion (18), respectively. The image data is displayed in the LCD (17), and the audio data is converted to analog audio signals in the audio output processing portion (18), amplified, and output from the speaker (19) as audio.

When the release button (23) is fully pressed in still image photography mode, or when the release button (23) is fully pressed in addition to the moving image photography button (22) in moving image photography mode, the still image processing portion (10) performs the compression and other processes on the image data sent from the image signal processing portion (6). A JPEG (Joint Photographic coding Experts Group) system, for example, is used as the compression process. The image data processed by the still image processing portion (10) is recorded on the recording medium (15) via the buffer memory (13) and the interface portion (14). Further, in the case in which the image data which has been recorded on the recording medium (15) is played back, the still image processing portion (10) performs the decompression and other processes on the recorded data sent from the recording medium (15) via the interface portion (14) and the buffer memory (13). The image data achieved through these processes is sent to the LCD driver (16) and displayed to the LCD (17).

In order to display characters (including numbers and symbols), icons, frames, and the like together with a moving image or still image to the LCD (17), the image pickup device is provided with an OSD (On Screen Display) controller (20). The OSD controller (20) creates display data for the characters and so on as instructed by the system controller (4) and sends this to an accumulator (21). The display data is superposed on the image data sent from the buffer memory (13) by the accumulator (21) and sent to the LCD driver (16).

The system controller (4) includes a CPU, a ROM, a RAM, and so on illustrations of which have been omitted, and performs a variety of controls in the image pickup device. To the system controller (4) are connected the moving image photography button (22), the release button (23), other buttons not shown in FIG. 1 and FIG. 2 (shown all together as an operating portion (24) in FIG. 3), a first LED (25), and a second LED (26). The release button (23) is a two-step push-type, and is provided with a first switch (23a) which turns on when the release button (23) is pressed half-way down and a second switch (23b) which turns on when the release button (23) is fully pressed.

The flash lamp device with which the image pickup device is provided includes a light source portion (27) and a pop up mechanism portion (28) which moves the light source portion (27) vertically. The pop up mechanism portion (28) includes a guide mechanism, a stepping motor, and so on for the light source portion (27), and vertical movement of the light source portion (27) is performed by the stepping motor being driven by the system controller (4) via a motor driver (29). The form of the flash lamp device in the image pickup device of the present invention is not limited to the present embodiment but includes whatever may achieve the purpose of the present invention. For example, the light source portion may be configured to hide inside the main unit portion of the image pickup device when being stored.

Next, the still image photography operation during moving image photography which is performed by the image pickup device according to the embodiment of the present invention is described. FIG. 4 is a flowchart showing this operation. First, when the moving image photography button (22) is pressed with the moving image photography mode set by the operating portion (24), the image pickup device begins photography of a moving image (S1). The system controller (4) drives the CCD driver (5) and reads the image signals from the CCD (3) in the prescribed cycle. The moving image processing portion (9) sequentially processes the image data sent from the image signal processing portion (6), and, as described above, this image data is processed together with the audio data sent from the audio input processing portion (11) and recorded on the recording medium (15). The system controller (4) repeatedly performs an automatic focusing operation based on the image data sequentially sent from the image signal processing portion (6). The system controller (4) determines whether or not the moving image photography button (22) is pressed (S2) and when the moving image photography button (22) is no longer pressed, stops photography of a moving image (S3). As long as the moving image photography button (22) is pressed, photography of a moving image is continuously performed.

While the moving image photography button (22) is pressed, the system controller (4) determines whether or not the release button (23) is pressed half-way down, or in other words whether the first switch (23a) is turned on or not (S4). When the release button (23) is pressed half-way down, the system controller (4) drives the pop up mechanism portion (28) via the motor driver (29) and raises the light source portion (27) of the flash lamp device, or in other words "pops it up" (S5). When the release button (23) is pressed half-way down, the system controller (4) causes the first LED (25), which is provided in a front surface of the image pickup device, to flash for a predetermined amount of time (a few seconds, for example) (S6). Thanks to the popping up of the light source portion (27) and the flashing of the first LED (25), the person who is the subject is notified that photography of a still image will be performed. In other words, by visually recognizing the popping up of the light source portion (27) and the flashing of the first LED (25), the subject is notified that photography of a still image will be performed. In order to notifying the subject of photography of a still image, the first LED (25) may be lit up continuously for a predetermined amount of time.

When the release button (23) is pressed half-way down, the system controller (4) operates the OSD controller (20), and displays the settings related to the still image photography operation to the LCD (17) (S7). FIG. 2 shows the icons (30), which show the settings, displayed in the LCD (17). The settings are, for example, the resolution of the image data of the still images to be recorded on the recording medium (15), the compression ratio of the image data, the white balance setting, and so on. These settings are selected or set by the photographer's operating the operating portion (24) ahead of time, and are stored in the system controller (4). The settings related to still image photography operations are thus displayed to the LCD (17) and the photographer can know when still image photography begins and check the settings.

Further, when the release button (23) is pressed half-way down, the image pickup device performs a focus readjustment operation (S8). After this readjustment operation is complete, the system controller (4) causes the second LED (26) to flash for a predetermined amount of time (a few seconds, for example), thereby notifying the photographer that the focus is correct (S9). The second LED (26) may also be lit up continuously for a predetermined amount of time, in order to notify the photographer that the focus is correct. The focal position of the focus lens (2) through the readjustment operation is maintained until the photography of the still image is complete. The photographer can thereby prevent the background from being focused on instead of the subject, and can photograph the still image in which the subject is clear.

After steps S5 through S9, the system controller (4) determines whether the release button (23) is fully pressed or not, or in other words whether or not the second switch (23b) is turned on (S10). In the case in which the release button (23) is fully pressed, the image pickup device photographs a still image (S11). The system controller (4) determines the need to cause the light source portion (27) of the flash lamp device to emit light based on the image data sent from the image signal processing portion (6), and causes the light source portion (27) to emit light in the case in which a need is determined. The image signals read from the CCD (3) after the release button (23) is fully pressed are converted into the image data by the image signal processing portion (6) and sent to the still image processing portion (10). The image data undergoes the compression and other processes by the still image processing portion (10) and is then recorded to the recording medium (15) as the still image.

The system controller (4) finishes display to the LCD (17) of the settings related to the still image photography operation after photography of the still image (S12). The photographer thereby knows that the photography of the still image is complete. The system controller (4) causes the first LED (25) to light up continuously for a predetermined amount of time (5 seconds, for example) (S13). The system controller (4) drives the pop up mechanism via the motor driver (29) and lowers the light source portion (27) of the flash lamp device, and the light source portion (27) is stored in the housing main body of the image pickup device (S14). The subject knows that the photography of the still image is complete by the lighting up of the first LED (25) and the storage of the light source portion (27). The image pickup device performs the processes in the moving image processing portion (9) for the image data recorded as moving images and the recording to the recording medium (15) in parallel during steps S4 through S14.

In FIG. 4 steps S5 through S8 are shown in order for convenience's sake, but these steps are not limited to this order, and may be all performed simultaneously, for example. This also applies to steps S12 through S14. In the present embodiment, the flash lamp device in which the light source portion (27) pops up and the first LED (25), which is a light emitting means, are provided as means for notifying the subject of still image photography during photography of a moving image, but one or the other may be omitted. Furthermore, in the present embodiment, the second LED (26) is used as a means for notifying the photographer that the focus is correct through focus readjustment, but a small sound that notifies that focus is correct may, for example, be caused to be generated for a short period of time from the speaker (19) or an icon or the like notifying that focus is correct may be displayed to the LCD (17) through an instruction from the system controller (4).

The above description of an embodiment is for describing the present invention, and should not be interpreted as limiting or restricting the scope of claims of the invention. It goes without saying that the configuration of the components of the present invention is not limited to the above embodiment, and that various modifications are possible within the technical scope of the listed claims.

INDUSTRIAL APPLICABILITY

With the present invention, it is possible to notify a subject that a still image is being photographed during photography of a moving image and anticipation of the timing of the photography of the still image is possible by the subject in an image pickup apparatus capable of photographing still images during moving image photography.

The invention claimed is:

1. An image pickup device capable of photographing still images during photography of a moving image, wherein:
   an LED which lights up or flashes to notify a subject that a photographic operation of a still image is to be performed when a release button is pressed half-way down during the photography of the moving image is provided;
   the photographic operation of the still image is performed when the release button is fully pressed during the photography of the moving image; and
   the LED lights up or flashes for a predetermined amount of time when the release button is pressed half-way down during the photography of the moving image.

2. The image pickup device according to claim 1, wherein settings related to the photographic operation of the still image are displayed in a display portion when the release button is pressed half-way down.

3. The image pickup device according to claim 2, wherein the settings include the resolution of the image data of the still image.

4. The image pickup device according to claim 1, wherein a focusing operation is performed during the photography of the moving image.

5. The image pickup device according to claim 4, wherein a focus readjustment operation is performed when the release button is pressed half-way down, and comprising a second LED which notifies that focus is corrected after the readjustment operation is complete is provided.

6. The image pickup device according to claim 1, comprising a flash lamp device in which a light source portion pops up to notify the subject that the photographic operation of the still image is to be performed when the release button is pressed half-way down during the photography of the moving image.

7. The image pickup device according to claim 6, comprising a controller which causes the popped-up light source to emit light if needed.

8. The image pickup device according to claim 1, wherein the photography of the moving image is continuously performed as long as a moving image photography button is pressed, and the LED lights up or flashes for the predetermined amount of time when the release button is pressed half-way down while the moving image photography button is pressed.

9. The image pickup device according to claim 8, wherein the photographic operation of the still image is performed when the release button is fully pressed while the moving image photography button is pressed.

10. The image pickup device according to claim 8, wherein a focusing operation is performed during the photography of the moving image.

11. The image pickup device according to claim 10, wherein a focus readjustment operation is performed when the release button is pressed half-way down, and a second LED which notifies that focus is corrected after the readjustment operation is complete is provided.

12. The image pickup device according to claim 8, comprising a flash lamp device in which a light source portion pops up to notify the subject that the photographic operation of the still image is to be performed when the release button is pressed half-way down while the moving image photography button is pressed.

13. The image pickup device according to claim 12, comprising a controller which causes the popped-up light source to emit light if needed.

* * * * *